12) United States Patent
Vanderlaan

(10) Patent No.: US 9,188,702 B2
(45) Date of Patent: Nov. 17, 2015

(54) SILICONE HYDROGELS HAVING IMPROVED CURING SPEED AND OTHER PROPERTIES

(75) Inventor: Douglas G. Vanderlaan, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 74 days.

(21) Appl. No.: 13/604,680

(22) Filed: Sep. 6, 2012

(65) Prior Publication Data
US 2013/0085205 A1 Apr. 4, 2013

Related U.S. Application Data

(60) Provisional application No. 61/541,556, filed on Sep. 30, 2011.

(51) Int. Cl.
G02B 1/04 (2006.01)
C08J 3/075 (2006.01)
C08L 83/04 (2006.01)
C08L 83/06 (2006.01)

(52) U.S. Cl.
CPC .............. G02B 1/043 (2013.01); C08J 3/075 (2013.01); C08L 83/04 (2013.01); C08L 83/06 (2013.01); C08J 2383/04 (2013.01)

(58) Field of Classification Search
USPC .................... 523/107; 528/26, 30; 524/916
See application file for complete search history.

(56) References Cited

U.S. PATENT DOCUMENTS

| 3,220,960 | A | 11/1965 | Wichterle et al. |
| 3,408,429 | A | 10/1968 | Wichterle |
| 3,660,545 | A | 5/1972 | Wichterle |
| 3,808,178 | A | 4/1974 | Gaylord |
| 4,113,224 | A | 9/1978 | Clark et al. |
| 4,120,570 | A | 10/1978 | Gaylord |
| 4,136,250 | A | 1/1979 | Mueller et al. |
| 4,153,641 | A | 5/1979 | Deichert et al. |
| 4,197,266 | A | 4/1980 | Clark et al. |
| 4,259,467 | A | 3/1981 | Keogh et al. |
| 4,495,313 | A | 1/1985 | Larsen |
| 4,740,533 | A | 4/1988 | Su et al. |
| 4,889,664 | A | 12/1989 | Kindt-Larsen et al. |
| 4,910,277 | A | 3/1990 | Bambury et al. |
| 5,034,461 | A | 7/1991 | Lai et al. |
| 5,039,459 | A | 8/1991 | Kindt-Larsen et al. |
| 5,070,215 | A | 12/1991 | Bambury et al. |
| 5,087,392 | A | 2/1992 | Burke et al. |
| 5,214,452 | A | 5/1993 | Kossmehl et al. |
| 5,244,981 | A | 9/1993 | Seidner et al. |
| 5,264,878 | A | 11/1993 | Gruber et al. |
| 5,314,960 | A | 5/1994 | Spinelli et al. |
| 5,321,108 | A | 6/1994 | Kunzler et al. |
| 5,331,067 | A | 7/1994 | Seidner et al. |
| 5,371,147 | A | 12/1994 | Spinelli et al. |
| 5,387,622 | A | 2/1995 | Kunzler et al. |
| 5,519,069 | A | 5/1996 | Burke et al. |
| 5,539,016 | A | 7/1996 | Kunzler et al. |
| 5,962,548 | A | 10/1999 | Vanderlaan et al. |
| 5,998,498 | A | 12/1999 | Vanderlaan et al. |
| 6,020,445 | A | 2/2000 | Vanderlaan et al. |
| 6,087,412 | A | 7/2000 | Chabrecek et al. |
| 6,367,929 | B1 | 4/2002 | Maiden et al. |
| 6,822,016 | B2 | 11/2004 | McCabe et al. |
| 6,867,245 | B2 | 3/2005 | Iwata et al. |
| 7,249,848 | B2 | 7/2007 | Laredo et al. |
| 7,473,738 | B2 | 1/2009 | Arnold et al. |
| 7,786,185 | B2 | 8/2010 | Rathore et al. |
| 8,476,389 | B2 * | 7/2013 | Maggio et al. ................. 526/279 |
| 2002/0016383 | A1 | 2/2002 | Iwata et al. |
| 2003/0125498 | A1 | 7/2003 | McCabe et al. |
| 2003/0162862 | A1 | 8/2003 | McCabe et al. |
| 2004/0192872 | A1 | 9/2004 | Iwata et al. |
| 2010/0280146 | A1 | 11/2010 | Vanderlaan et al. |
| 2011/0140292 | A1 * | 6/2011 | Chang et al. .................... 264/1.1 |
| 2011/0230589 | A1 | 9/2011 | Maggio et al. |
| 2011/0237766 | A1 | 9/2011 | Maggio et al. |
| 2011/0249234 | A1 * | 10/2011 | Duis et al. ................. 351/160 R |
| 2012/0202916 | A1 * | 8/2012 | Laredo et al. ................. 523/107 |

FOREIGN PATENT DOCUMENTS

| EP | 0080539 B1 | 6/1983 |
| EP | 1800150 B1 | 8/2008 |
| WO | 9631792 A1 | 10/1996 |
| WO | 03022321 A2 | 3/2003 |
| WO | 03022322 A2 | 3/2003 |
| WO | WO 2011116206 A1 | 9/2011 |

OTHER PUBLICATIONS

PCT International Search Report, dated Nov. 15, 2012, for PCT Int'l Appln. No. PCT/US2012/057000.

Crivello, et al, Photoinitiators for Free Radical Cationic & Anionic Photopolymerisation, 2nd Edition, vol. III, pp. 275-298, John Wiley and Sons, New York, 1998.

PCT International Preliminary Report on Patentability, dated Apr. 1, 2014, for PCT Int'l Appln. No. PCT/US2012/057000.

* cited by examiner

Primary Examiner — Tae H Yoon

(57) ABSTRACT

The present invention relates to: to a silicone polymer formed from reactive components containing (i) at least one silicone component and (ii) 2-hydroxyethyl acrylamide; a silicone hydrogel containing such silicone polymer; a biomedical device (e.g., a contact lens) containing such polymer; and a biomedical device formed from such hydrogel.

15 Claims, No Drawings

SILICONE HYDROGELS HAVING IMPROVED CURING SPEED AND OTHER PROPERTIES

This application claims priority to U.S. Provisional Patent Application No. 61/541,556, filed on Sep. 30, 2011 entitled SILICONE HYDROGELS HAVING IMPROVED CURING SPEED AND OTHER PROPERTIES, the contents of which are incorporated by reference.

FIELD OF THE INVENTION

The present invention relates to silicone polymers/silicone hydrogels and ophthalmic devices, such as contact lenses formed therefrom.

BACKGROUND OF THE INVENTION

Contact lenses have been used commercially to improve vision since the 1950s. The first contact lenses were made of hard materials. Although these lenses are still currently used, they are not suitable for all patients due to their poor initial comfort and their relatively low permeability to oxygen. Later developments in the field gave rise to soft contact lenses, based upon hydrogels, which are extremely popular today. Many users find soft lenses are more comfortable, and increased comfort levels can allow soft contact lens users to wear their lenses longer than users of hard contact lenses.

A hydrogel is a hydrated crosslinked polymeric system that contains water in an equilibrium state. Hydrogels typically are oxygen permeable and biocompatible, making them preferred materials for producing biomedical devices and in particular contact or intraocular lenses.

Conventional hydrogels are prepared from monomeric mixtures predominantly containing hydrophilic monomers, such as 2-hydroxyethyl methacrylate ("HEMA") or N-vinyl pyrrolidone ("NVP"). U.S. Pat. Nos. 3,220,960, 4,495,313, 4,889,664, and 5,039,459 disclose the formation of conventional hydrogels. Blends of such mixtures are cured, typically, using heat or light activated initiators. The time required to cure such blends typically ranges from a few minutes to more than 24 hours. In commercial processes, it is preferable that the cure times be short. The resulting polymers are swelled in water. The absorbed water softens the resulting hydrogels and allows for some degree of oxygen permeability.

The present invention relates to the discovery of a silicone polymer/silicone hydrogels containing 2-hydroxyethyl acrylamide and ophthalmic devices, such as contact lenses, formed therefrom, which have improved curing speed and other properties.

SUMMARY OF THE INVENTION

In one aspect, the present invention relates: to a silicone polymer formed from reactive components containing (i) at least one silicone component and (ii) 2-hydroxyethyl acrylamide; a silicone hydrogel containing such silicone polymer; a biomedical device (e.g., a contact lens) containing such polymer; and a biomedical device formed from such hydrogel, each having a whole light transmissivity of at least about 90%.

Other features and advantages of the present invention will be apparent from the detailed description of the invention and from the claims.

DETAILED DESCRIPTION OF THE INVENTION

It is believed that one skilled in the art can, based upon the description herein, utilize the present invention to its fullest extent. The following specific embodiments can be construed as merely illustrative, and not limitative of the remainder of the disclosure in any way whatsoever.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

DEFINITIONS

As used herein, a "biomedical device" is any article that is designed to be used while either in or on mammalian tissues or fluid. Examples of these devices include, but are not limited to, catheters, implants, stents, and ophthalmic devices such as intraocular lenses and contact lenses.

As used herein an "ophthalmic device" is any device which resides in or on the eye or any part of the eye, including the cornea, eyelids and ocular glands. These devices can provide optical correction, cosmetic enhancement, vision enhancement, therapeutic benefit (for example as bandages) or delivery of active components such as pharmaceutical and neutraceutical components, or a combination of any of the foregoing. Examples of ophthalmic devices include, but are not limited to, lenses and optical and ocular inserts, including, but not limited to punctal plugs and the like.

As used herein, the term "lens" refers to ophthalmic devices that reside in or on the eye. The term lens includes, but are not limited to, but is not limited to soft contact lenses, hard contact lenses, intraocular lenses, and overlay lenses.

In one embodiment, the biomedical devices, ophthalmic devices and lenses of the present invention include silicone polymers or silicone hydrogels. These silicone hydrogels typically contain a silicone component and/or hydrophobic and hydrophilic monomers that are covalently bound to one another in the cured device.

As used herein "reactive mixture" refers to the mixture of components (both reactive and non-reactive) which are mixed together and subjected to polymerization conditions to form the silicone hydrogels of the present invention. The reactive mixture comprises reactive components such as monomers, macromers, prepolymers, cross-linkers, and initiators, and additives such as wetting agents, release agents, dyes, light absorbing compounds such as UV absorbers and photochromic compounds, any of which may be reactive or non-reactive but are capable of being retained within the resulting biomedical device, as well as pharmaceutical and neutriceutical compounds. It will be appreciated that a wide range of additives may be added based upon the biomedical device which is made, and its intended use. Concentrations of components of the reactive mixture are given in weight % of all components in the reaction mixture, excluding diluent. When diluents are used their concentrations are given as weight % based upon the amount of all components in the reaction mixture and the diluent.

Silicone Component

A silicone-containing component (or silicone component) is one that contains at least one [—Si—O—Si] group, in a monomer, macromer or prepolymer. In one embodiment, the Si and attached O are present in the silicone-containing component in an amount greater than 20 weight percent, such as greater than 30 weight percent of the total molecular weight of the silicone-containing component. Useful silicone-containing components include polymerizable functional groups such as acrylate, methacrylate, acrylamide, methacrylamide, N-vinyl lactam, N-vinylamide, and styryl functional groups.

Examples of silicone-containing components which are useful in this invention may be found in U.S. Pat. Nos. 3,808,178; 4,120,570; 4,136,250; 4,153,641; 4,740,533; 5,034,461; 5,962,548; 5,998,498; and 5,070,215, and European Patent No. 080539.

Suitable silicone-containing components include compounds of Formula I

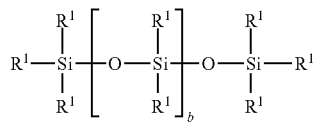

Formula I wherein:
$R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-50 Si—O repeat units (in some embodiments between 1-20 and 1-10) which may further comprise functionality selected from alkyl, hydroxy, amino, oxa, carboxy, alkyl carboxy, alkoxy, amido, carbamate, halogen or combinations thereof;

where b=0 to 100 (in some embodiments 0 to 20 or 0-10), where it is understood that when b is other than 0, b is a distribution having a mode equal to a stated value; and wherein at least one $R^1$ comprises a monovalent reactive group, and in some embodiments from one to three $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof. The $C_{1-6}$alkyl(meth)acrylates, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls may be substituted with hydroxyl groups, ether groups or combinations thereof.

Suitable monovalent alkyl and aryl groups include unsubstituted monovalent $C_1$ to $C_{16}$ alkyl groups, $C_6$-$C_{14}$ aryl groups, such as methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms, and in another embodiment one $R^1$ is a monovalent reactive group, two $R^1$ are trialkyl siloxanyl groups and the remaining $R^1$ are methyl, ethyl or phenyl and in a further embodiment one $R^1$ is a reactive group, two $R^1$ are trialkyl siloxanyl groups and the remaining $R^1$ are methyl. Non-limiting examples of silicone components of this embodiment include propenoic acid,-2-methyl-, 2-hydroxy-3-[3-[1,3,3,3-tetramethyl-1-[(trimethylsilyl)oxy]-1-disiloxanyl]propoxy]propyl ester ("SiGMA"; structure in Formula II),

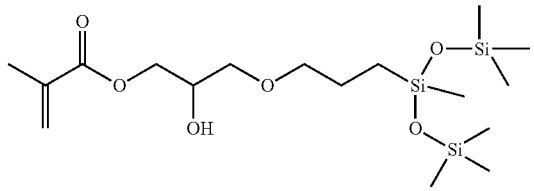

Formula II 2-hydroxy-3-methacryloxypropyloxypropyl-tris(trimethylsiloxy)silane,
3-methacryloxypropyltris(trimethylsiloxy)silane ("TRIS"),
3-methacryloxypropylbis(trimethylsiloxy)methylsilane, and
3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"; structure in Formula III),

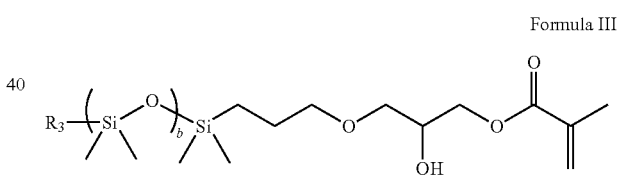

Formula III

Wherein $R_3$ is a C1-6 alkyl and b is as defined above. An example of a suitable HO-mPDMS is

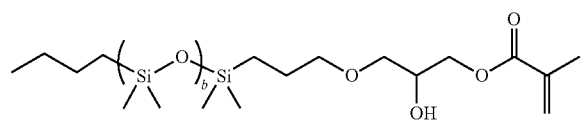

Additional examples of silicone components of this embodiment include monomethacryloxypropyl terminated mono-n-butyl terminated polydimethylsiloxanes (800-1000 MW), ("mPDMS"; structure in Formula IV).

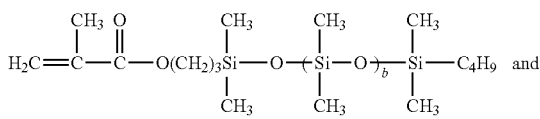

Formula IVa

-continued

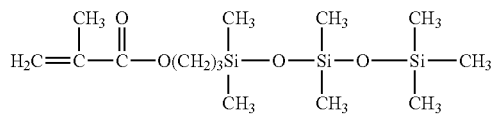

Formula IVb

In another embodiment one terminal $R^1$ is a monovalent reactive group comprising $C_{1-6}$alkyl(meth)acrylamides, which may C1-3 alkyl or hydroxy alkyl substitution on the amide N, b is 1-10, the other terminal $R^1$ is selected from C1-4 alkyl and the remaining $R^1$ are methyl or ethyl. Such silicone containing components are disclosed in US2011/237766.

In one embodiment the silicone containing component is a polymerizable ester, such as a (meth)acrylate ester.

In another embodiment, the silicone component comprises a polydimethylsiloxane bis-methacrylate with pendent hydroxyl groups, such as compound C2, C4 or R2 described in US Patent Application No. 2004/0192872 or such as is described in Examples XXV, XXVIII, or XXXII in U.S. Pat. No. 4,259,467, polymerizable polysiloxanes with pendant hydrophilic groups such as those disclosed in U.S. Pat. No. 6,867,245. In some embodiments the pendant hydrophilic groups are hydroxyalkyl groups and polyalkylene ether groups or combinations thereof. The polymerizable polysiloxanes may also comprise fluorocarbon groups. An example is shown as structure B3.

wherein: Y denotes O—, S— or NH—; R denotes, hydrogen or methyl; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and the compound of Formula VI.

Formula VI

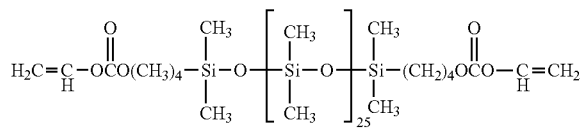

Where biomedical devices with modulus below about 200 are desired, only one $R^1$ shall comprise a monovalent reactive group and no more than two of the remaining $R^1$ groups will comprise monovalent siloxane groups.

Another suitable silicone containing macromer is compound of Formula VII (in which x+y is a number in the range of 10 to 30) formed by the reaction of fluoroether, hydroxy-terminated polydimethylsiloxane, isophorone diisocyanate and isocyanatoethylmethacrylate.

Formula VII

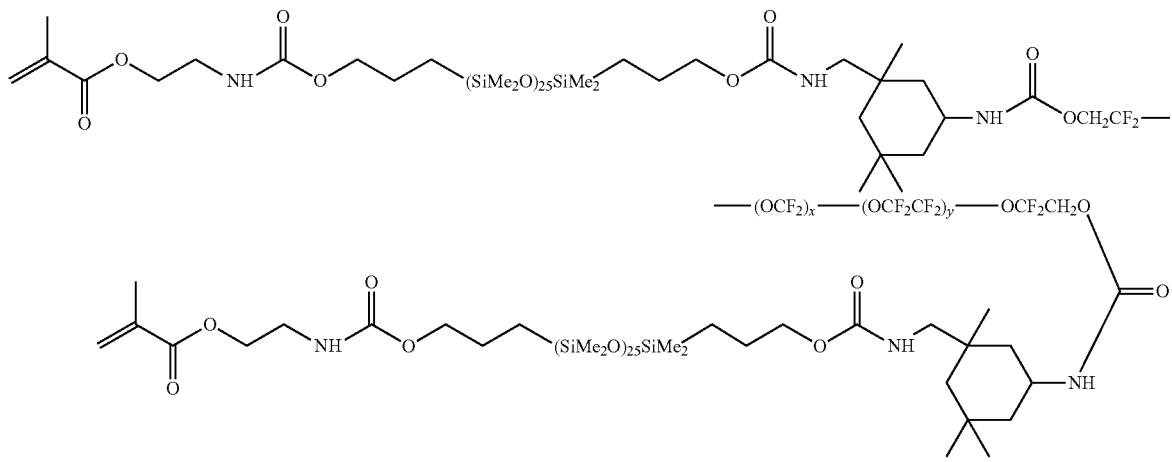

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In another embodiment, one to four $R^1$ comprises a vinyl carbonate or carbamate of Formula V:

Formula V

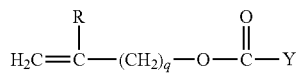

Other silicone components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components include silicone containing macromers made via GTP, such as those disclosed in U.S. Pat Nos. 5,314,960, 5,331,067, 5,244,981, 5,371,147 and 6,367,929. U.S. Pat. Nos. 5,321,108; 5,387,662 and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

In one embodiment of the present invention where a modulus of less than about 120 psi is desired, the majority of the mass fraction of the silicone-containing components used in the lens formulation should contain only one polymerizable functional group ("monofunctional silicone containing component"). In this embodiment, to insure the desired balance of oxygen transmissibility and modulus it is preferred that all components having more than one polymerizable functional group ("multifunctional components") make up no more than 10 mmol/100 g of the reactive components, and preferably no more than 7 mmol/100 g of the reactive components.

In one embodiment, the silicone component is selected from the group consisting of monomethacryloxypropyl terminated, mono-n-alkyl terminated polydialkylsiloxane; bis-3-acryloxy-2-hydroxypropyloxypropyl polydialkylsiloxane; methacryloxypropyl-terminated polydialkylsiloxane; mono-(3-methacryloxy-2-hydroxypropyloxy)propyl terminated, mono-alkyl terminated polydialkylsiloxane; and mixtures thereof In one embodiment, the silicone component is selected from monomethacrylate terminated polydimethylsiloxanes; bis-3-acryloxy-2-hydroxypropyloxypropyl polydialkylsiloxane; and mono-(3-methacryloxy-2-hydroxypropyloxy)propyl terminated, mono-butyl terminated polydialkylsiloxane; and mixtures thereof.

In one embodiment, the silicone component has an average molecular weight of from about 400 to about 4000 daltons.

The silicone containing component(s) may be present in amounts up to about 95 weight %, and in some embodiments from about 10 and about 80 and in other embodiments from about 20 and about 70 weight %, based upon all reactive components.

2-Hydroxyethyl Acrylamide (HEAA)

The reactive mixture also contains 2-hydroxyethyl acrylamide ("HEAA; structure in Formula VIII).

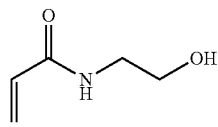

Formula VIII

As discussed below in the Examples, HEAA was unexpectedly found to improved curing speed and other properties of the resulting silicone polymer, silicone hydrogel, and/or biomedical device (e.g., contact lens), while still retaining the clarity or transmissivity of articles formed therefrom.

HEAA may be present in a wide range of amounts, depending upon the specific balance of properties desired. In one embodiment, the amount of the hydrophilic component is up to about 50 weight %, such as from about 5 and about 40 weight %. In another embodiment the HEAA is present in an amount up to about 10 wt %, and in other embodiments between about 1 and about 10%.

Hydrophilic Component

In one embodiment, the reactive mixture may also contain at least one hydrophilic component in addition to the 2-hydroxyethyl acrylamide. In one embodiment, the hydrophilic components can be any of the hydrophilic monomers known to be useful to make hydrogels.

One class of suitable hydrophilic monomers include acrylic- or vinyl-containing monomers. Such hydrophilic monomers may themselves be used as crosslinking agents, however, where hydrophilic monomers having more than one polymerizable functional group are used, their concentration should be limited as discussed above to provide a contact lens having the desired modulus.

The term "vinyl-type" or "vinyl-containing" monomers refer to monomers containing the vinyl grouping ($-CH=CH_2$) and that are capable of polymerizing.

Hydrophilic vinyl-containing monomers which may be incorporated into the silicone hydrogels of the present invention include, but are not limited to, monomers such as N-vinyl amides, N-vinyl lactams (e.g. NVP), N-vinyl-N-methyl acetamide, N-vinyl-N-ethyl acetamide, N-vinyl-N-ethyl formamide, N-vinyl formamide, with NVP being preferred.

"Acrylic-type" or "acrylic-containing" monomers are those monomers containing the acrylic group: ($CH_2=CRCOX$) wherein R is H or $CH_3$, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid, mixtures thereof and the like.

Other hydrophilic monomers that can be employed in the invention include, but are not limited to, polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215 and the hydrophilic oxazolone monomers disclosed in U.S. Pat. No. 4,910,277. Other suitable hydrophilic monomers will be apparent to one skilled in the art.

In one embodiment the hydrophilic component comprises at least one hydrophilic monomer such as DMA, HEMA, glycerol methacrylate, 2-hydroxyethyl methacrylamide, NVP, N-vinyl-N-methyl acrylamide, polyethyleneglycol monomethacrylate, and combinations thereof. In another embodiment, the hydrophilic monomers comprise at least one of DMA, HEMA, NVP and N-vinyl-N-methyl acrylamide and mixtures thereof. In another embodiment, the hydrophilic monomer comprises DMA and/or HEMA.

In another embodiment the reaction mixture comprises at least one monomer of the formula

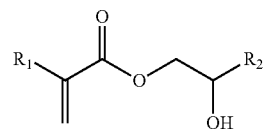

where $R^1$ is H or $CH_3$ and $R^2$ is H or C1-6 alkyl.

The hydrophilic component(s) (e.g., hydrophilic monomer(s)) may be present in a wide range of amounts, depending upon the specific balance of properties desired. In one embodiment, the amount of the hydrophilic component is up to about 60 weight %, such as from about 5 and about 40 weight %.

Polymerization Initiator

One or more polymerization initiators may be included in the reaction mixture. Examples of polymerization initiators include, but are not limited to, compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2, 4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N, N-dimethylamino)benzoate. Commercially available visible light initiator systems include, but are not limited to, Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998.

The polymerization initiator is used in the reaction mixture in effective amounts to initiate photopolymerization of the reaction mixture, such as from about 0.1 to about 2 weight %. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxy-cyclohexyl phenyl ketone and bis(2,6-dimethoxybenzoyl)-2, 4-4-trimethylpentyl phosphine oxide (DMBAPO), and in another embodiment the method of polymerization initiation is via visible light activation. A preferred initiator is bis(2,4, 6-trimethylbenzoyl)-phenyl phosphine oxide (Irgacure 819®).

Internal Wetting Agent

In one embodiment, the reaction mixture includes one or more internal wetting agents. Internal wetting agents may include, but are not limited to, high molecular weight, hydrophilic polymers such as those described in U.S. Pat. Nos. 6,367,929; 6,822,016; 7786185; PCT Patent Application Nos. WO03/22321 and WO03/22322, or reactive, hydrophilic polymers such as those described in U.S. Pat. No. 7,249,848. Examples of internal wetting agents include, but are not limited to, polyamides such as poly(N-vinyl pyrrolidone), poly(N,N-dimethacrylamide) and poly (N-vinyl-N-methyl acetamide). Other polymers such as hyaluronic acid, phosphorylcholine and the like may also be used.

The internal wetting agent(s) may be present in a wide range of amounts, depending upon the specific parameter desired. In one embodiment, the amount of the wetting agent(s) is up to about 50 weight %, such as from about 5 and about 40 weight %, such as from about 6 to about 40 weight %.

Other Components

Other components that can be present in the reaction mixture used to form the contact lenses of this invention include, but are not limited to, compatibilizing components (such as those disclosed in US Patent Application Nos. 2003/162862 and US2003/125498), ultra-violet absorbing compounds, medicinal agents, antimicrobial compounds, copolymerizable and nonpolymerizable dyes, release agents, reactive tints, pigments, combinations thereof and the like. In one embodiment, the sum of additional components may be up to about 20 wt %. In one embodiment the reaction mixtures comprise up to about 18 wt % wetting agent, and in another embodiment, from about 5 and about 18 wt % wetting agent.

Diluents

In one embodiment, the reactive components (e.g., silicone containing component, 2-hydroxyethyl acrylamide, hydrophilic monomers, wetting agents, and/or other components) are mixed together either with or without a diluent to form the reaction mixture.

In one embodiment a diluent is used having a polarity sufficiently low to solubilize the non-polar components in the reactive mixture at reaction conditions. One way to characterize the polarity of the diluents of the present invention is via the Hansen solubility parameter, $\delta p$. In certain embodiments, the $\delta p$ is less than about 10, and preferably less than about 6. Suitable diluents are further disclosed in US Patent Application No. 20100280146 and U.S. Pat. No. 6,020,445.

Classes of suitable diluents include, without limitation, alcohols having 2 to 20 carbons, amides having 10 to 20 carbon atoms derived from primary amines, ethers, polyethers, ketones having 3 to 10 carbon atoms, and carboxylic acids having 8 to 20 carbon atoms. As the number of carbons increase, the number of polar moieties may also be increased to provide the desired level of water miscibility. In some embodiments, primary and tertiary alcohols are preferred. Preferred classes include alcohols having 4 to 20 carbons and carboxylic acids having 10 to 20 carbon atoms.

In one embodiment, the diluents are selected from 1,2-octanediol, t-amyl alcohol, 3-methyl-3-pentanol, decanoic acid, 3,7-dimethyl-3-octanol, tripropylene methyl ether (TPME), butoxy ethyl acetate, mixtures thereof and the like.

In one embodiment, the diluents are selected from diluents that have some degree of solubility in water. In some embodiments at least about three percent of the diluent is miscible water. Examples of water soluble diluents include, but are not limited to, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, decanoic acid, octanoic acid, dodecanoic acid, 1-ethoxy-2-propanol, 1-tert-butoxy-2-propanol, EH-5 (commercially available from Ethox Chemicals), 2,3,6,7-tetrahydroxy-2,3,6,7-tetramethyl octane, 9-(1-methylethyl)-2,5,8,10,13,16-hexaoxaheptadecane, 3,5,7,9,11,13-hexamethoxy-1-tetradecanol, mixtures thereof and the like.

Curing of Silicone Polymer/Hydrogel and Manufacture of Lens

The reactive mixture of the present invention may be cured via any known process for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the contact lenses of this invention are formed by the direct molding of the silicone hydrogels, which is economical, and enables precise control over the final shape of the hydrated lens. For this method, the reaction mixture is placed in a mold having the shape of the final desired silicone hydrogel and the reaction mixture is subjected to conditions whereby the monomers polymerize, to thereby produce a polymer in the approximate shape of the final desired product.

In one embodiment, after curing, the lens is subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. In one embodiment the aqueous solutions of the present invention comprise at least about 30 weight % water, in some embodiments at least about 50 weight % water, in some embodiments at least about 70% water and in others at least about 90 weight % water. Aqueous solutions may also include additional water soluble components such as release agents, wetting agents, slip agents, pharmaceutical and nutraceutical components, combinations thereof and the like. Release agents are compounds or mixtures of compounds which, when combined with water, decrease the time required to release a contact lens from a mold, as compared to the time required to release such a lens using an aqueous solution that does not comprise the release agent. In one embodiment the aqueous solutions comprise less than about 10 weight %, and in others less than about 5 weight % organic solvents such as isopropyl alcohol, and in another embodiment are free from organic solvents. In these embodiments the aqueous solutions do not require special handling, such as purification, recycling or special disposal procedures.

In various embodiments, extraction can be accomplished, for example, via immersion of the lens in an aqueous solution or exposing the lens to a flow of an aqueous solution. In various embodiments, extraction can also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation or both.

Some embodiments can also include the application of physical agitation to facilitate leach and release. For example, the lens mold part to which a lens is adhered, can be vibrated or caused to move back and forth within an aqueous solution. Other embodiments may include ultrasonic waves through the aqueous solution.

The lenses may be sterilized by known means such as, but not limited to autoclaving.

Contact Lens Properties

It will be appreciated that all of the tests specified herein have a certain amount of inherent test error. Accordingly, results reported herein are not to be taken as absolute numbers, but numerical ranges based upon the precision of the particular test.

Oxygen Permeability (Dk)

The oxygen permeability (or Dk) is measured as follows. Lenses are positioned on a polarographic oxygen sensor consisting of a 4 mm diameter gold cathode and a silver ring anode then covered on the upper side with a mesh support. The lens is exposed to an atmosphere of humidified 2.1% $O_2$. The oxygen that diffuses through the lens is measured by the sensor. Lenses are either stacked on top of each other to increase the thickness or a thicker lens is used. The L/Dk of 4 samples with significantly different thickness values are measured and plotted against the thickness. The inverse of the regressed slope is the Dk of the sample. The reference values are those measured on commercially available contact lenses using this method. Balafilcon A lenses (available from Bausch & Lomb) give a measurement of approximately 79 barrer. Etafilcon lenses give a measurement of 20 to 25 barrer. (1 barrer=$10^{-10}$ ($cm^3$ of gas×$cm^2$)/($cm^3$ of polymer×sec×cm Hg)).

In one embodiment, the lenses have an oxygen permeability greater than about 50, such as greater than about 60, such as greater than about 80, such as greater than about 100.

Whole Light Transmissivity

The whole light transmissivity was measured using an SM color computer (model SM-7-CH, manufactured by Suga Test Instruments Co. Ltd.). Water on the lens sample is lightly wiped off, and then the sample is set in the light path and measured. The thickness was measured using an ABC Digimatic Indicator (ID-C112, manufactured by Mitsutoyo Corporation), and samples with a thickness between 0.14 and 0.15 mm were measured.

Modulus/Elongation/Toughness

Modulus (or tensile modulus) is measured by using the crosshead of a constant rate of movement type tensile testing machine equipped with a load cell that is lowered to the initial gauge height. A suitable testing machine includes an Instron® model 1122. A dog-bone shaped sample from a −1.00 power lens having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. At least five specimens of each composition are measured and the average is reported. Tensile modulus is measured at the initial linear portion of the stress/strain curve. In one embodiment, the tensile modulous is less than 400 psi, such as less than 150 psi, such as less than 125 psi, such as less than 100 psi.

The percent elongation is measured using the following equation:

$$\text{Percent elongation} = [(Lf-Lo)/Lo] \times 100.$$

In one embodiment the elongation is at least 100%, such as at least 150%, such as at least 200%, such as at least 250%

The toughness of the material is calculated from the energy to break ($E_B$) the material divided by the rectangular volume of the specimen (length×width×height). The energy to break the material ($E_B$) is calculated from the area under the load/displacement curve.

$$\text{Toughness is} = E_B/(\text{length} \times \text{width} \times \text{height}).$$

In one embodiment, the toughness is at least 100 in·lbf/$in^3$, such as at least 125 in·lbf/$in^3$, such as at least 150 in·lbf/$in^3$.

Water Content

Water content is measured as follows. The lenses to be tested are allowed to sit in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a weighing pan and weighed. The two more sets of samples are prepared and weighed as above. The pan and lenses are weighed three times and the average is the wet weight.

The dry weight is measured by placing the sample pans in a vacuum oven which has been preheated to 60° C. for 30 minutes. Vacuum is applied until at least 0.4 inches Hg is attained. The vacuum valve and pump are turned off and the lenses are dried for four hours. The purge valve is opened and the oven is allowed reach atmospheric pressure. The pans are removed and weighed. The water content is calculated as follows:

Wet weight =
combined wet weight of pan and lenses − weight of weighing pan

Dry weight = combined dry weight of pan and lens − weight of weighing pan $$\% \text{ water content} = \frac{(\text{wet weight} - \text{dry weight})}{\text{wet weight}} \times 100$$

The average and standard deviation of the water content are calculated for the samples are reported. In one embodiment, the % water content is from about 20 to 70%, such as from about 30 to 65%

Dynamic Advancing Contact Angle (DCA)

The advancing contact angle was measured as follows. Four samples from each set were prepared by cutting out a center strip from the lens approximately 5 mm in width and equilibrated in packing solution. The wetting force between the lens surface and borate buffered saline is measured at 23° C. using a Wilhelmy microbalance while the sample is being immersed into or pulled out of the saline. The following equation is used $$F = 2\gamma p \cos \theta \text{ or } \theta = \cos^{-1}(F/2\gamma p)$$

where F is the wetting force, $\gamma$ is the surface tension of the probe liquid, p is the perimeter of the sample at the meniscus and $\theta$ is the contact angle. The advancing contact angle is obtained from the portion of the wetting experiment where the sample is being immersed into the packing solution. Each sample was cycled four times and the results were averaged to obtain the advancing contact angles for the lens.

EXAMPLES

These examples do not limit the invention. They are meant only to suggest a method of practicing the invention. Those knowledgeable in contact lenses as well as other specialties may find other methods of practicing the invention. The following abbreviations are used in the examples below:

Blue HEMA the reaction product of Reactive Blue 4 and HEMA, as described in Example 4 of U.S. Pat. No. 5,944,853
DMA N,N-dimethylacrylamide
HEAA 2-hydroxyethyl acrylamide
HEMA 2-hydroxyethyl methacrylate
Irgacure 819 bis(2,4,6-trimethylbenzoyl)-phenylphosphineoxide
Norbloc 2-(2'-hydroxy-5-methacrylyloxyethylphenyl)-2H-benzotriazole
OH-mPDMS mono-(3-methacryloxy-2-hydroxypropyloxy) propyl terminated, mono-butyl terminated polydimethylsiloxane (Synthesis described in US Patent Application 2008/0004383)
PVP poly(N-vinyl pyrrolidone) (K values noted)
TEGDMA tetraethyleneglycol dimethacrylate
TPME tripropylene methyl ether Example 1

Manufacture of Hydrogel Contact Lens

A series of five blends, using increasing amounts of HEAA in place of DMA (0%, 25%, 50%, 75%, and 100%), were prepared and as shown below in Table 1. For each blend, all components were added and mixed on a jar roller until everything had dissolved. All blends were clear.

TABLE 1

| | Blend Formulations | | | | |
|---|---|---|---|---|---|
| Component | Blend 1 (wt. %) | Blend 2 (wt. %) | Blend 3 (wt. %) | Blend 4 (wt. %) | Blend 5 (wt. %) |
| OH-mPDMS | 55.0 | 55.0 | 55.0 | 55.0 | 55.0 |
| HEMA | 8.0 | 8.0 | 8.0 | 8.0 | 8.0 |
| TEGDMA | 3.0 | 3.0 | 3.0 | 3.0 | 3.0 |
| Blue HEMA | 0.04 | 0.04 | 0.04 | 0.04 | 0.04 |
| Norbloc | 2.2 | 2.2 | 2.2 | 2.2 | 2.2 |
| Irgacure 819 | 0.25 | 0.25 | 0.25 | 0.25 | 0.25 |
| DMA | 19.5 | 14.5 | 9.7 | 4.9 | 0 |
| HEAA | 0 | 4.9 | 9.7 | 14.5 | 19.5 |
| PVP K90 | 12.16 | 12.16 | 12.16 | 12.16 | 12.16 |
| Decanoic acid (diluent)* | 20.26 | 20.26 | 20.26 | 20.26 | 20.26 |
| TPME (diluent)* | 24.75 | 24.75 | 24.75 | 24.75 | 24.75 |

*Amounts of diluents are shown as weight percent of combination of all components. Amounts of other components are shown as weight percent of reactive components, excluding diluents.

Blends 1-5 were placed in glass vials with caps removed in a nitrogen-filled glove box for at least one hour. Plastic contact lens molds were filled with one of the blends in the nitrogen-filled glove box and placed about three inches under Philips TL03 20W fluorescent bulbs for 30 minutes. The lenses were cured in a nitrogen atmosphere at room temperature for 30 minutes. The lenses were leached as follows: first, in a 50% isopropanol:50% borate buffered saline solution for 30 minutes; then in three cycles of 100% isopropanol for 30 minutes each; then in 50% isopropanol:50% borate buffered saline solution for 30 minutes; and lastly in 3 cycles of 100% borate buffered saline solution for 30 minutes each.

Example 2

Whole Light Transmissivity Testing

Lenses were made from Blends 2, 3, 4 and 5 above, except omitting the Blue HEMA. The lenses were tested using the whole light transmissivity test described above. The results are shown in Table 2.

Example 3

Mechanical Property Testing

The resulting lenses of Example 2 were submitted for Dk, DCA, water content, and mechanicals testing to determine the effect of the addition of HEAA in place of DMA on various lens properties.

TABLE 2

Various Lens Properties

|  | Blend 1 | Blend 2 | Blend 3 | Blend 4 | Blend 5 |
|---|---|---|---|---|---|
| Water content (%) | 43.5 | 44.7 | 45.2 | 43.8 | 45.1 |
| Modulus (psi) | 129.2 | 113.1 | 108.8 | 106.7 | 89.7 |
| Elongation (%) | 188.1 | 198.6 | 224.3 | 260.3 | 310 |
| Toughness (in·lbf/in$^3$) | 107.4 | 109.4 | 129.7 | 168.8 | 195.9 |
| DCA | 72 ± 10° | 69 ± 9° | 79 ± 5° | 96 ± 6° | 90 ± 12° |
| Dk (barrers) | 96 | 98 | 101 | 95 | 105 |
| Whole light Transmissivity (%) | NT | 92.3 | 92.1 | 92.3 | 92.6 |

These results in Table 2 show the addition of HEAA unexpectedly both reduced the modulus of the contact lens (i.e., from 129.2 to 89.7 psi) while also increased the elongation strength of the lens (i.e., from 188.1 to 310%) and the toughness of the lens (i.e., from 107.4 to 195.9). The lenses formed from blends 2 through 5 were all very clear, with whole light transmissivities of about 92%. Comparing these lenses with those formed in Comparative Examples 1-6 of US2011/0230589 which had transmissivities between 8.6 and 82%, lenses formed from the polymers of the present invention display substantially improved whole light transmissivity.

Example 4

Cure Characteristics of Hydrogels Containing HEAA

The cure characteristics for Blend 1 (containing DMA) and Blend 5 (containing HEAA) shown above in Table 1 were studied using a TA Instruments model Q100 photo-DSC equipped with a universal LED module from Digital Light Labs model number ULM-1-420. Samples were placed on the stage with nitrogen flushing, and equilibrated first at 25° C. for 5 minutes, then at 70° C. for 5 minutes, and then the photocure process was initiated providing 4 mW/cm$^2$.

Base curves were plotted using sigmoidal correction. The cure times were calculated using TA Universal Analysis 2000 software. The enthalpy, time to cure, and time to 25, 50, 75, 90, 95 and 99.5 percent cure are shown in Table 3. Each blend was tested several times and the values in the table represent the averages of from 3 to 4 runs.

TABLE 3

Photocure Results

| Cure Averages | Time to Peak (min) | Enthalpy (J/g) | Time to 25% Cure (min) | Time to 50% Cure (min) | Time to 75% Cure (min) | Time to 90% Cure (min) | Time to 95% Cure (min) | Time to 99.5% Cure (min) |
|---|---|---|---|---|---|---|---|---|
| Blend 1 | 0.37 | 116.17 | 0.69 | 1.41 | 2.34 | 3.34 | 4.07 | 6.24 |
| Blend 5 | 0.43 | 124.60 | 0.54 | 1.02 | 1.52 | 2.00 | 2.42 | 4.70 |

These results show that the hydrogel containing HEAA (Blend 5) unexpectedly cured much faster than the hydrogel containing DMA (Blend 1). Further, despite the decreased cure time, the lens produced by Blend 5 also unexpectedly demonstrated a lower modulus, increased elongation, and increase in toughness as indicated in Table 2.

Example 5

Manufacture of Hydrogel Contact Lens

This example was designed to evaluate the effect on water content using HEAA instead of DMA in a standard silicone hydrogel lens blend. Two blends shown in Table 4 were manufactured as described in Example 2. All blends were clear.

TABLE 4

Blend Formulations

| Component | Blend 6 (wt. %) | Blend 7 (wt. %) |
|---|---|---|
| OH-mPDMS | 55.0 | 55.0 |
| HEMA | 8.0 | 8.0 |
| TEGDMA | 3.0 | 3.0 |
| Blue HEMA | 0.04 | 0.04 |
| Norbloc | 2.2 | 2.2 |
| Irgacure 819 | 0.14 | 0.14 |
| DMA | 31.4 | 0.00 |
| HEAA | 0.00 | 31.4 |
| TPME (diluent)* | 45.01 | 45.01 |

*Amounts of diluents are shown as weight percent of combination of all components. Amounts of other components are shown as weight percent of reactive components, excluding diluents.

Blends 6 and 7 were then manufactured into contact lens as set forth in Example 2. Lenses were also made from Blend 7, but omitting Blue HEMA. They were tested for whole light transmissivity and the result is shown in Table 5.

Example 6

Mechanical Property Testing

The lenses manufactured in Example 5 were submitted for DCA and water content analysis. These results are given in Table 5. The results show that HEAA unexpectedly increased the water content of the lens.

TABLE 5

Lens Properties

|  | Blend 6 | Blend 7 |
|---|---|---|
| Water Content (%) | 37.2 | 44.2 |
| DCA | 97 ± 3° | 99 ± 8° |
| Whole light transmissivity | NT | 91.7 |

What is claimed is:

1. A silicone hydrogel polymer having a whole light transmissivity of at least 90% at a thickness of thickness between 0.14 and 0.15 mm, a water content of about 20 to about 70%, wherein said polymer is formed from reactive components comprising (i) about 20 to about 70 weight % at least one (meth)acrylate ester silicone component (ii) about 1 to about 25 weight % 2-hydroxyethyl acrylamide; (iii) about 5 and about 40 weight % at least one additional hydrophilic component; and (iv) at least one crosslinker.

2. The silicone hydrogel polymer of claim 1 wherein said at least one silicone component comprises at least one trialkylsiloxy silyl group.

3. The silicone hydrogel polymer of claim 1 wherein at least one silicone component is selected from compounds of Formula I:

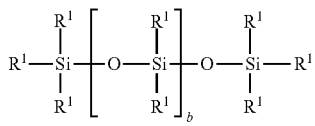

Formula I wherein:
R$^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-50 Si—O repeat units which may further comprise functionality selected from alkyl, hydroxy, amino, oxa, carboxy, alkyl carboxy, alkoxy, amido, carbamate, halogen or combinations thereof;
where b=0 to 100, where it is understood that when b is other than 0, b is a distribution having a mode equal to a stated value; and
wherein at least one R$^1$ comprises a (meth)acrylate ester.

4. The silicone hydrogel polymer of claim 1 wherein said at least one silicone component is selected from the group consisting of monomethacryloxypropyl terminated, mono-n-alkyl terminated polydialkylsiloxane; bis-3-acryloxy-2-hydroxypropyloxypropyl polydialkylsiloxane; methacryloxypropyl-terminated polydialkylsiloxane; mono-(3-methacryloxy-2-hydroxypropyloxy)propyl terminated, mono-alkyl terminated polydialkylsiloxane; and mixtures thereof.

5. The silicone hydrogel polymer of claim 1 wherein said at least one silicone component is selected from monomethacrylate terminated polydimethylsiloxanes; bis-3-acryloxy-2-hydroxypropyloxypropyl polydialkylsiloxane; and mono-(3-methacryloxy-2-hydroxypropyloxy)propyl terminated, mono-butyl terminated polydialkylsiloxane; and mixtures thereof.

6. The silicone hydrogel polymer of claim 1, wherein said at least one silicone component comprises mono-(3-methacryloxy-2-hydroxypropyloxy)propyl terminated, mono-butyl terminated polydialkylsiloxane.

7. The silicone hydrogel polymer of claim 1, wherein said additional hydrophilic components comprise at least one other hydrophilic acrylic-containing monomer.

8. The silicone hydrogel polymer of claim 7, wherein said at least one additional hydrophilic component is 2-hydroxyethyl methacrylate and/or N,N-dimethylacrylamide.

9. The silicone hydrogel polymer of claim 1, wherein 2-hydroxyethyl acrylamide is present in an amount of about 1 to about 10 wt %.

10. The silicone hydrogel polymer of claim 1 wherein said reaction mixture further comprises at least one monomer of Formula

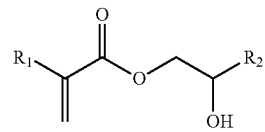

Where R$^1$ is H or CH$_3$ and R$^2$ is H or C1-6 alkyl.

11. A contact lens comprising the silicone hydrogel polymer of claim 1.

12. The contact lens of claim 11, wherein said contact leans has an elongation of at least 200%.

13. The contact lens of claim 11, wherein said contact leans has a modulus of less than 120 psi.

14. A biomedical device comprising the polymer of claim 1.

15. The polymer of claim 1 where said water content is about 30 to about 65%.

* * * * *